UNITED STATES PATENT OFFICE.

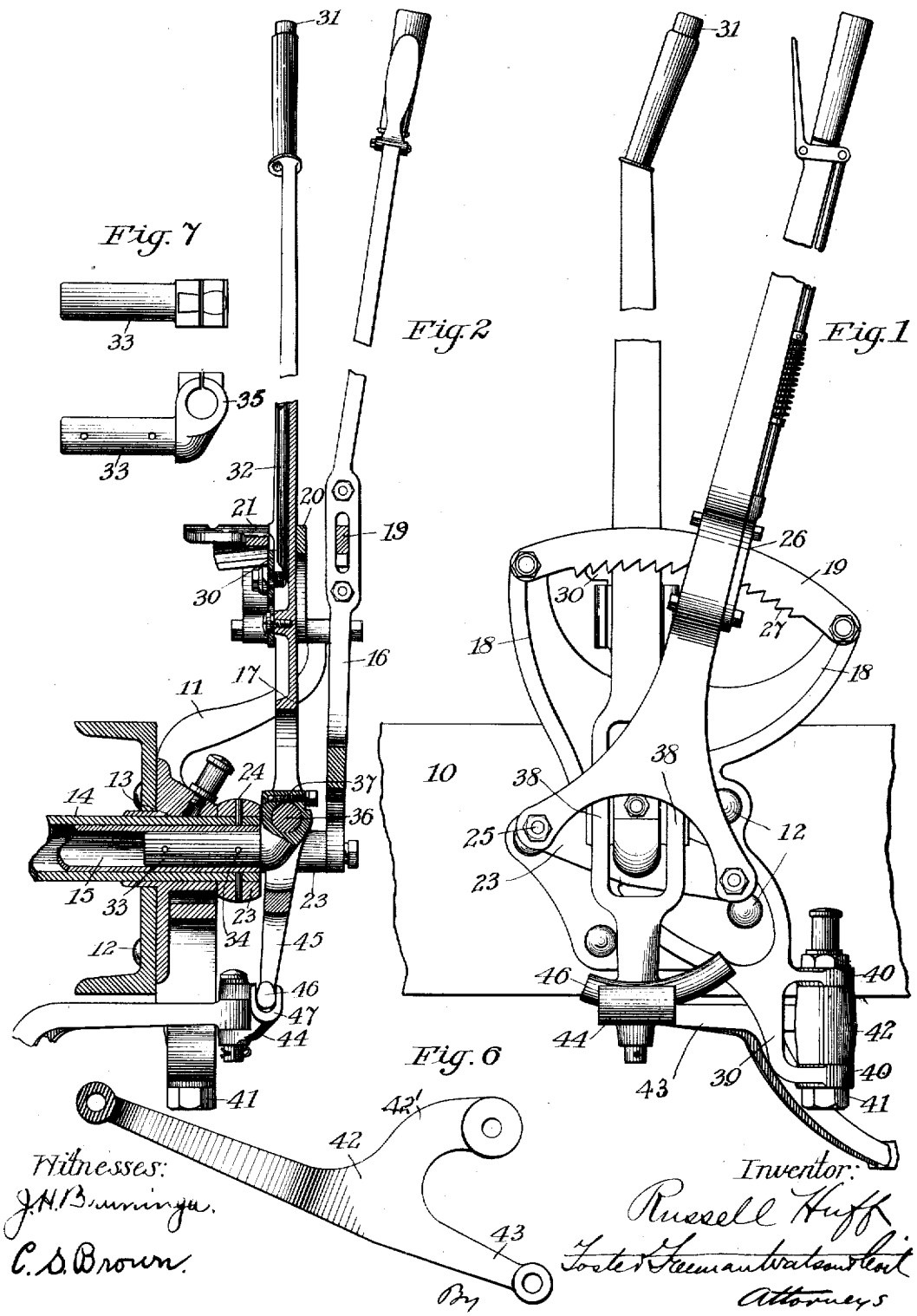

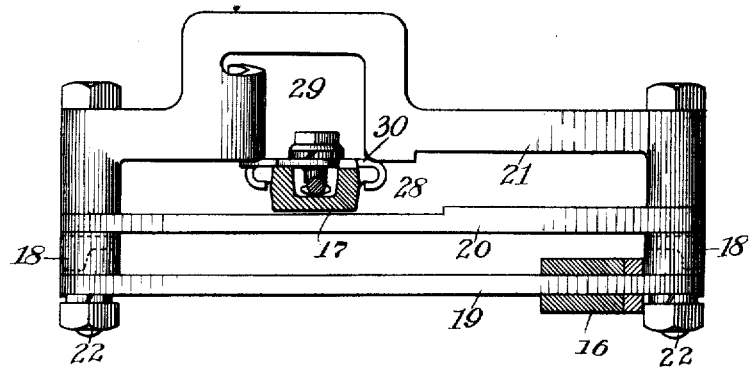
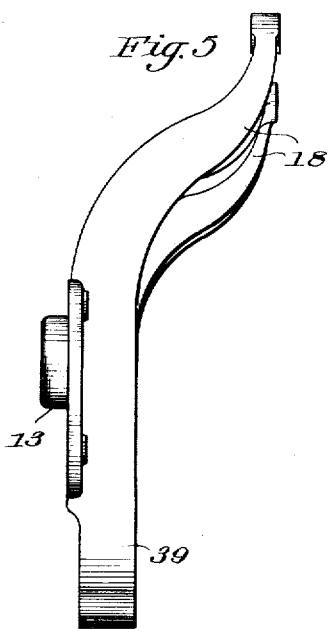
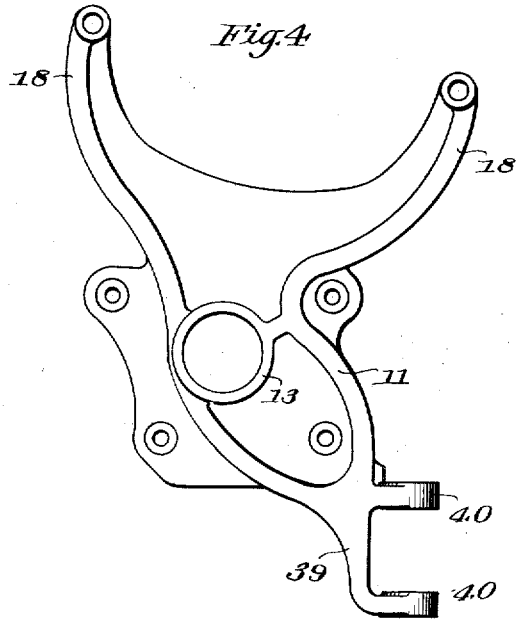

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CONTROLLING MECHANISM FOR MOTOR-VEHICLES.

1,121,838.  Specification of Letters Patent.  Patented Dec. 22, 1914.

Application filed August 13, 1910. Serial No. 577,053.

*To all whom it may concern:*

Be it known that I, RUSSELL HUFF, a citizen of the United States, and resident of Detroit, Wayne county, State of Michigan, have invented certain new and useful Improvements in Controlling Mechanism for Motor-Vehicles, of which the following is a specification.

This invention relates to controlling mechanism and more particularly to such mechanism as is employed for controlling the gears, the brake, or other controlled mechanism of a motor vehicle.

The object of this invention is to simplify the construction of such mechanism and to arrange the parts in a most compact and efficient form.

The invention will be described in connection with the accompanying drawings, in which:

Figure 1 is a side elevation of a portion of a motor vehicle with a controlling mechanism embodying my invention; Fig. 2 is a vertical section through the parts shown in Fig. 1 and showing some of the parts in elevation; Fig. 3 is a plan view of the lever guiding members showing the levers in section; Figs. 4 and 5 are side and end views, respectively, of the lever bracket; and Figs. 6 and 7 are detail views of parts.

Referring to the drawings, 10 represents one of the side members of a motor vehicle frame, to which a bracket 11 of peculiar form is secured as by rivets 12. This bracket 11 is provided with a main transverse bearing 13 in which are mounted a pair of concentric or nested shafts 14 and 15 connected respectively with the brake lever 16 and the gear shifting or controlling lever 17. The bracket 11 is further provided with a pair of separated upwardly extending arms 18 to which the guide members 19, 20 and 21 are secured by bolts 22 as shown particularly in Fig. 3. These guide members form the guides for the controlling and brake levers.

A yoke 23 is secured to the outer end of the shaft 14 as by brazing and pins 24. The brake lever has its lower bifurcated end secured to the ends of the yoke by bolts 25 so that the outer shaft can be rocked by the brake lever. It will be understood that the outer shaft is suitably connected to the brake mechanism. This construction permits the gear shifting lever 17 to be connected to the inner shaft 15 and mounted inside of the brake lever whereby the brake lever shaft which must bear the greater strains may be the outer and stronger of the two nested shafts. The brake lever 16 is provided with a latch 26 which coöperates with the teeth 27 on the guiding member 19 for setting the brake in various positions.

The gear shifting lever 17 is adapted to move forwardly and backwardly in a slot 28 formed between the guide members 20 and 21 to obtain various forward speeds of the vehicle and is also adapted to be moved laterally or transversely into the notch or recess 29 formed in the guide member 21 to mesh the reverse gears of the vehicle. A suitable latch 30 operated by a thumb piece 31 and a rod 32 may be provided to prevent the gear shifting lever being moved into reverse position inadvertently.

In the end of the operating shaft 15, which may be connected with the forward speed gears of the vehicle, is a plug 33 brazed or secured to the shaft 15 by pins 34, and this plug projects slightly from the shaft and is formed with a pair of jaws 35 adapted to clamp between them a trunnion piece 36, the clamping action being obtained by a bolt 37. Thus the trunnion piece 36 is securely held against either rotary or endwise movement and no cotter pins or other securing devices are necessary.

The gear shifting lever 17 is divided adjacent its connection with the plug 33 and is formed with trunnion bearings 38 which fit the trunnion piece 36 and it will be seen that this connection causes the operating shaft 15 to be rocked by the forward and backward movements of the lever 17 and permits an independent movement of the lever 17 into the notch 29, this latter movement being accomplished by rocking the lever on the trunnion piece 36.

The bracket 11 is further provided with an integral forwardly extending lug 39 upon which are two separated ears 40 forming a bearing for the pivot bolt 41 and the operating lever 42. This operating lever has an arm 43 which is connected by a link 44 with the downwardly extending end 45 of the gear shifting lever 17. The lever 42 is also provided with an arm 42′ which is connected with the reverse gear shifting mechanism. Said end 45 is formed with a segmental piece 46 which moves in a groove or slideway 47 in the link 44 whereby the backward and forward movements of the lever 17 are not conveyed to the operating lever 42, but the transverse movement of the lever 17 causes the lever 42 to rock upon its pivot and through other suitable connections, not shown, to operate the reverse gears of the vehicle.

It will thus be seen that all the bearings for the levers together with the guides are supported on a single bracket and that all these bearings are integral therewith whereby the bearings and the other parts may be accurately machined and the parts may be easily assembled with a minimum of expense. The lug 30 and the ears 40 thereon project forwardly so as to lie in substantially the same plane with the body of the bracket so that the bearing lugs will not project beyond the bracket any more than necessary, thereby not only improving appearances but also rendering the structure more compact since the operating lever 42 can be located below the side member with the greater part of it within the outside limits of the side member. It will be seen that the operating lever is curved so as to permit this construction.

By connecting the controlling lever to the inner shaft and the brake lever to the outer shaft the controlling lever can be located inside of the brake lever nearest the chauffeur so that the operation thereof will be facilitated. This is of special advantage in view of the fact that the controlling lever is moved inwardly and therefore away from the brake lever for reversing. This construction also permits the outer shaft to become the brake shaft and thereby can be made much stronger for the same amount of material. This arrangement of the levers and shafts results in a very compact and simple arrangement.

It is obvious that various changes may be made in the details of construction without departing from this invention, and it is therefore to be understood that this invention is not to be limited to the specific construction shown and described.

Having thus described my invention, what I claim is:

1. In a controlling mechanism for motor vehicles, the combination with a controlling lever pivotally mounted between its ends and adapted to move forward and backward and transversely, of an operating lever connected with the controlling lever below the pivot thereof and adapted to be actuated by the transverse movement of the controlling lever, and a single bracket for supporting both of said levers.

2. In a controlling mechanism for motor vehicles, the combination with a bracket, of a controlling lever supported thereby, an operating lever, actuating connections between said levers, and a bearing for said operating lever on said bracket below the point of support of the controlling lever.

3. In a controlling mechanism for motor vehicles, the combination with a bracket, of a rock shaft supported on said bracket, a controlling lever supported on said shaft to rock the same and to swing transversely, a lever connected to said controlling lever to be operated thereby, and a bearing for said lever on said bracket below said rock shaft.

4. In a controlling mechanism for motor vehicles, a lever bracket provided with a transverse bearing, a pair of guide supporting arms above said bearing, and a pivotal bearing lug below said bearing.

5. In a controlling mechanism for motor vehicles, a lever bracket provided with a transverse bearing, a pair of spaced upwardly extending arms above said bearing, and a pivotal bearing lug below said bearing and integral therewith.

6. In a controlling mechanism for motor vehicles, a lever bracket provided with a transverse bearing, a pair of guide supporting arms above said bearing, and a forwardly extending pivotal bearing lug below said bearing.

7. In a controlling mechanism for motor vehicles, a lever bracket provided with guide supporting means, means for supporting a lever thereon, and a bearing lug located in substantially the same plane as the bracket body.

8. In a controlling mechanism for motor vehicles, a lever bracket provided with a transverse bearing, a pair of guide supporting arms above said bearing, and a bearing lug below said bearing and provided with a pair of vertically separated ears located in substantially the same plane as the bracket body.

9. In a controlling mechanism for motor vehicles, the combination with a side member of the vehicle, of a bracket secured thereto, a controlling lever mounted thereon, a bearing lug on said bracket, and a lever mounted on said bearing lug extending below said side member and connected to be operated by said controlling lever.

10. In a controlling mechanism for motor vehicles, the combination with a side member of the vehicle, of a bracket secured thereto, a controlling lever mounted thereon, a bearing lug on said bracket and extending below said side member, and a lever on said bearing lug and connected to be operated by said lever.

11. In a controlling mechanism for motor vehicles, the combination with a plurality of concentric shafts, of a controlling lever connected to operate the inner one of said shafts by a backward and forward movement, and movable transversely, mechanism operated by the transverse movement of said lever, and an additional lever connected to operate the outer one of said shafts.

12. In a controlling mechanism for motor vehicles, the combination with a plurality of concentric shafts, of a controlling lever connected to operate the inner one of said shafts and movable forward and backward and transversely to operating positions, and a brake lever mounted outside of said controlling lever and connected to operate another of said shafts.

13. In a controlling mechanism for motor vehicles, the combination with a plurality of concentric shafts, of a controlling lever mounted for transverse movement on the inner shaft, an additional lever mounted outside of said controlling lever, and a yoke connecting said last lever to the outer shaft.

14. In a controlling mechanism for motor vehicles, the combination with a plurality of concentric shafts, of a controlling lever mounted for transverse movement on the inner shaft and adapted to rock the same by a forward and backward movement, an additional lever mounted outside of said controlling lever, and a yoke connecting said last lever to the outer shaft.

15. In a controlling mechanism for motor vehicles, the combination with a plurality of concentric shafts, of a controlling lever mounted for transverse movement on the inner shaft and adapted to rock the same by a forward and backward movement, an arm on said controlling lever extending below said shafts, mechanism connected to said arm and operated by a transverse movement of said controlling lever, an additional lever mounted outside of said controlling lever, and a yoke connecting said last lever to the outer shaft.

16. In a controlling mechanism for motor vehicles, the combination with a bracket, of a plurality of concentric tubular shafts mounted in said bracket, a plug secured in the end of the inner shaft, a transverse pivot on said plug, a controlling lever mounted on said pivot, and an additional lever connected to operate the outer shaft.

17. In a controlling mechanism for motor vehicles, the combination with a bracket, of a plurality of concentric tubular shafts mounted in said bracket, a plug secured in the end of the inner shaft, a transverse pivot on said plug, a controlling lever mounted on said pivot, an additional lever outside of said controlling lever, and a yoke connecting said second lever to the outer shaft.

18. In a controlling mechanism for motor vehicles, the combination with a bracket having spaced arms and a lug, and a guide extending between said arms, of a controlling lever supported by said bracket and adapted to move along said guide, an operating lever, actuating connections between said levers, and a bearing for said operating lever on said lug below the controlling lever support.

19. In a controlling mechanism for motor vehicles, the combination with a bracket, a tubular shaft supported therein, a plug secured in the end of said shaft and having jaws, a trunnion piece removably clamped in said jaws against rotary and endwise movement, and a controlling lever pivoted on said trunnion piece.

20. In a controlling mechanism for motor vehicles, the combination with a bracket, of a tubular shaft mounted in said bracket, a support on said shaft extended beyond the end thereof, a brake lever secured upon the outer end of said support, a shaft nested within said tubular shaft, a piece on said second shaft having a pair of clamping jaws, a trunnion piece removably secured in said jaws, and a controlling lever arranged inside of said brake lever and mounted upon said trunnion piece.

In testimony whereof I affix my signature in presence of two witnesses.

RUSSELL HUFF.

Witnesses:
W. H. FINCKEL, Jr.,
MAYME RYAN.

It is hereby certified that in Letters Patent No. 1,121,838, granted December 22, 1914, upon the application of Russell Huff, of Detroit, Michigan, for an improvement in "Controlling Mechanism for Motor-Vehicles," an error appears in the printed specification requiring correction as follows: Page 2, line 16, for the reference-numeral "30" read *39;* and that the said Letters Patent should be read with this correction therein that the same may conform to the record of the case in the Patent Office.

Signed and sealed this 9th day of February, A. D., 1915.

[SEAL.]

J. T. NEWTON,

*Acting Commissioner of Patents.*